United States Patent [19]

Cochran

[11] 4,379,671
[45] Apr. 12, 1983

[54] SYNCHRONIZED BOTTLE UNLOADING SYSTEM

[75] Inventor: Donald D. Cochran, Bartlett, Ill.

[73] Assignee: National Can Corporation, Chicago, Ill.

[21] Appl. No.: 113,271

[22] Filed: Jan. 18, 1980

Related U.S. Application Data

[63] Continuation-in-part of Ser. No. 909,617, May 26, 1978, abandoned.

[51] Int. Cl.³ .............................................. B65G 43/10
[52] U.S. Cl. ..................................... 414/331; 198/571; 198/575; 198/576; 198/577; 198/578
[58] Field of Search ............... 414/330, 331, 349, 351, 414/352, 353, 373, 390, 391, 392, 395, 416, 417, 567, 568; 198/380, 482, 484, 488, 448, 449, 493, 571, 572, 575, 576, 577, 578, 796, 801, 855, 856

[56] References Cited

U.S. PATENT DOCUMENTS

| | | | |
|---|---|---|---|
| 2,625,257 | 1/1953 | Schenk | 198/855 |
| 2,920,503 | 1/1960 | Burrows | 198/575 X |
| 3,075,630 | 1/1963 | Fisk | 198/572 |
| 3,452,856 | 7/1969 | Brittain | 198/577 X |
| 3,497,053 | 2/1970 | Backman | 198/794 X |
| 3,650,566 | 3/1972 | Lee et al. | 198/493 X |
| 3,719,267 | 3/1973 | Reist et al. | 198/577 X |
| 3,738,473 | 6/1973 | Herring | 198/380 X |
| 3,797,640 | 3/1974 | Aidlin et al. | 198/493 X |
| 4,073,375 | 2/1978 | Hart et al. | 198/577 X |
| 4,199,051 | 4/1980 | Kimberley | 198/801 X |

FOREIGN PATENT DOCUMENTS 676510 8/1979 U.S.S.R. .............................. 198/575

Primary Examiner—James L. Rowland
Attorney, Agent, or Firm—Robert A. Stenzel

[57] ABSTRACT

Improvements in an unloader unit for an automatic system for unloading articles, such as plastic milk bottles, from a truck trailer and depositing them onto a conveyor system includes a synchronization control system and means for stably positioning the articles during the unloading operation.

5 Claims, 6 Drawing Figures

SYNCHRONIZED BOTTLE UNLOADING SYSTEM

RELATED APPLICATIONS

This application concerns improvements to the "Bottle Unloading System" invention, which is the subject of U.S. Ser. No. 111,019, assigned in common and filed Jan. 10, 1980, on behalf of Ronald K. Coleman et al, and now abandoned which is a continuation-in-part of U.S. Ser. No. 909,617, filed May 26, 1978, and now abandoned.

BACKGROUND OF THE INVENTION

1. Field of the Invention

The present invention relates generally to article handling and conveying and, more particularly, to equipment for unloading dairy product containers from a truck trailer and depositing them onto a conveyor system.

2. The Prior Art

In accordance with the usual practice, plastic milk bottles or containers are hand-packed into large bags at the manufacturing plant. The containers are stacked within the bag, requiring a center board and at least one piece of corrugated packing for protecting the containers against damage. After packing, the bags are sealed with wire ties or by heat sealing equipment. Containers packaged in this manner are then stacked on pallets, which are then loaded into truck trailers for subsequent delivery to the dairy. At the dairy, the bags containing the bottles must be manually unloaded from the truck trailer, transported by forklift, and then manually opened. The bottles are removed from their bags and placed one-by-one on a conveyor system leading to a filling line. Recently, plastic containers, specifically the type which are blow molded, have been found to be acceptable alternatives to glass bottles and paper cartons for packaging milk. However, expenditures in man-power and product time required by the aforementioned method of manually packaging and unloading the containers for transport to the dairy filling line have kept the cost of using plastic containers undesirably high.

The above-identified U.S. Ser. No. 111,019 discloses an automatic system by which articles, such as plastic dairy containers, transported in a truck trailer may be unloaded and deposited onto a conveyor system. By providing apparatus capable of rapid and automatic unloading of plastic containers, the effective cost of plastic containers can be meaningfully reduced and the resulting product is quite cost competitive with paper and glass packaging. The automatic system includes an article unloader section in which articles are removed from carrier racks by means of a push rod assembly. The articles are arranged in the carrier on a series of shelves in which rows of bottles are aligned behind a line of forwardmost bottles. The push rod assembly serves to push the carrier bottles a forwardmost line at a time onto respective platforms of a article elevator, which passes the articles upward to adjacent a transfer mechanism. The transfer mechanism drives a set of lift fingers about a circular path which at one point intermesh with each elevator platform laden with articles to pick the articles up and transfer them onto a stationary shelf with which the finger set coincides further along its path. Paddles formed on an endless belt intermediate conveyor push the line of articles out onto a conveyor system which, in the case of dairy bottles, may lead to the dairy filling line. The elevator, transfer mechanism, and intermediate conveyor drives are all correlated to a common drive motor positioned at the lower end of the elevator in direct drive relationship with the lower elevator sprocket shaft. Drive transmission means for the correlated unloader elements are heavily made up of chains. Chains inherently have slack and, after a period of time, these chains stretch so that more slack is created in the lines. As movement of counterweights secured to drive shafts for the transfer mechanism shifts the tension on the elevator drive chain, relative movement slippage occurs. The result of this slippage is a jerking motion of the transfer mechanism tending to throw articles from the fingers. After a period of time, the lift fingers and elevator platforms move out of synchronization with one another, resulting in many articles coming ajar and not reaching the conveyor system and, especially in the case of the plastic containers, many articles being crushed, punctured, or otherwise destroyed.

Further problems occurring in the unloader operation for the automatic system disclosed in U.S. Ser. No. 111,019 arise in that, when lightweight plastic containers are being handled, stable supports and proper positioning of the containers becomes critical because the containers are so easily toppled. The present invention overcomes the aforementioned problems in the automatic unloading system, resulting in less downtime for the system and more reliable automatic unloading.

SUMMARY OF THE INVENTION

The present invention concerns improvements to an unloader unit within an automatic system by which articles transported in a truck trailer may be unloaded and deposited onto a conveyor system. For purposes of the preferred embodiment, the present invention is described in terms of handling plastic milk bottles at a dairy. Within the unloader, a synchronization control system maintains proper synchronization between an article elevator and a transfer mechanism, which drives a set of lift fingers about a circular path to intermesh with each elevator platform to pick articles off the platform as it passes upwardly and transfer them onto a stationary shelf from which the bottles are pushed onto a conveyor system. The synchronization system includes locating a common drive motor, which serves as drive for the elevator and transfer mechanism, in direct drive relationship with at least one bottle transfer mechanism drive shaft and driving the elevator through a variable speed transmission having a regulator controlled comparator switch assembly. The comparator serves to signal for adjustment of the variable speed transmission whenever movement of the elevator has advanced or retarded relative to the transfer mechanism within a preset range of deviation. Reference projections associated with the elevator platforms serve to engage upper or lower limit switches to indicate when the elevator is beginning to relatively advance or retard.

In order to assure stability for the articles during the unloading operation, air blasts are directed against the bottles as they are deposited onto the stationary shelf to center the bottle line in preparation of being pushed onto the conveyor. The air blasts are synchronized with movement of the bottle transfer mechanism. Further, elevator platforms are bell-mouthed to cam articles thereon and angled slightly backward to maintain the articles during movement.

DESCRIPTION OF THE PREFERRED EMBODIMENT

The preferred embodiment of the present invention is directed to the unloading of blow-molded plastic milk containers or bottles from a truck trailer and their deposit onto a dairy conveyor system leading to a filling line. Those skilled in the art will readily appreciate that the present invention will have application with various other types of articles.

Figure 1:
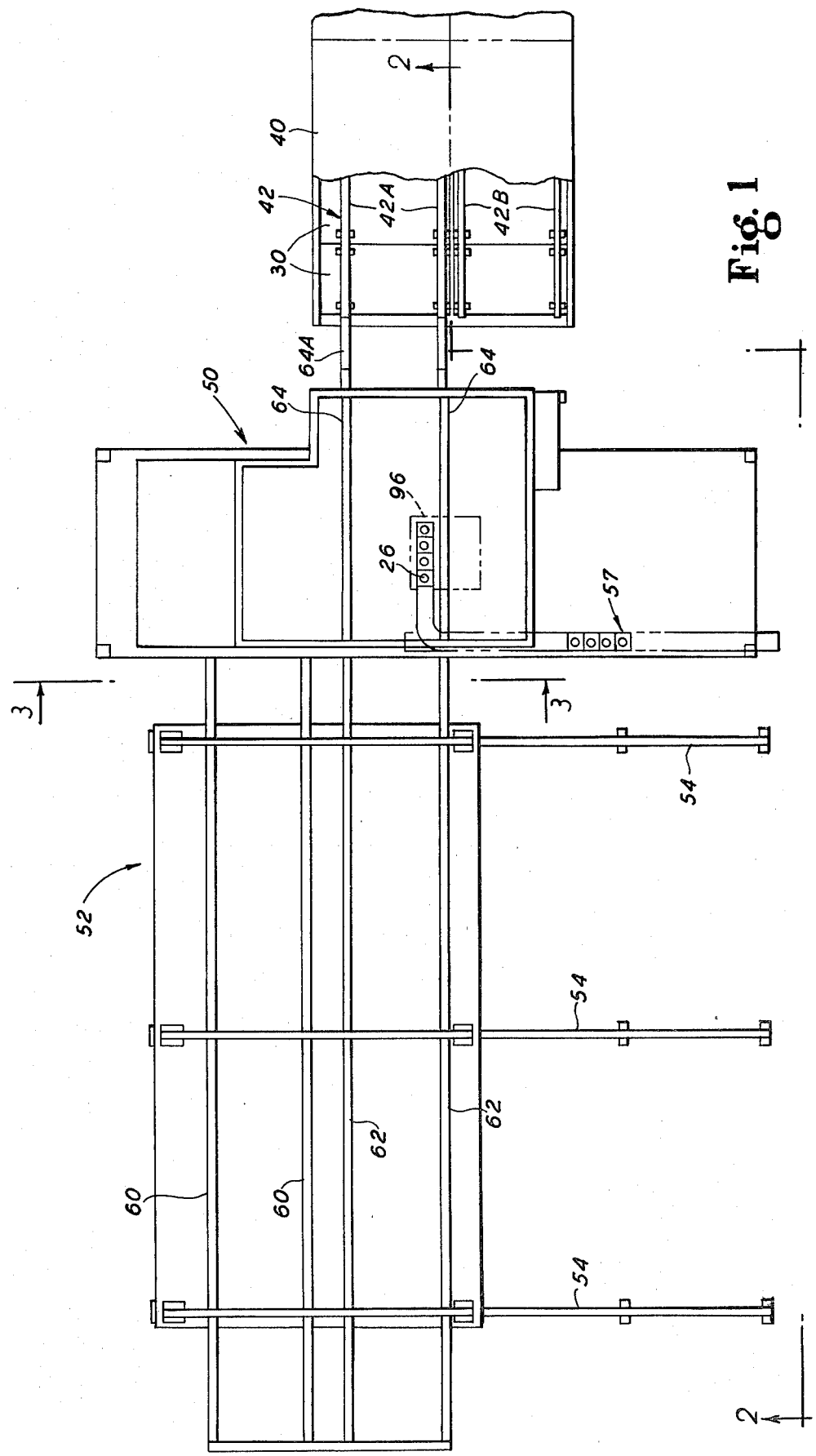
FIG. 1 is a schematic plan view of the automatic unloading system apparatus in which the present invention is incorporated.
Figure 2:
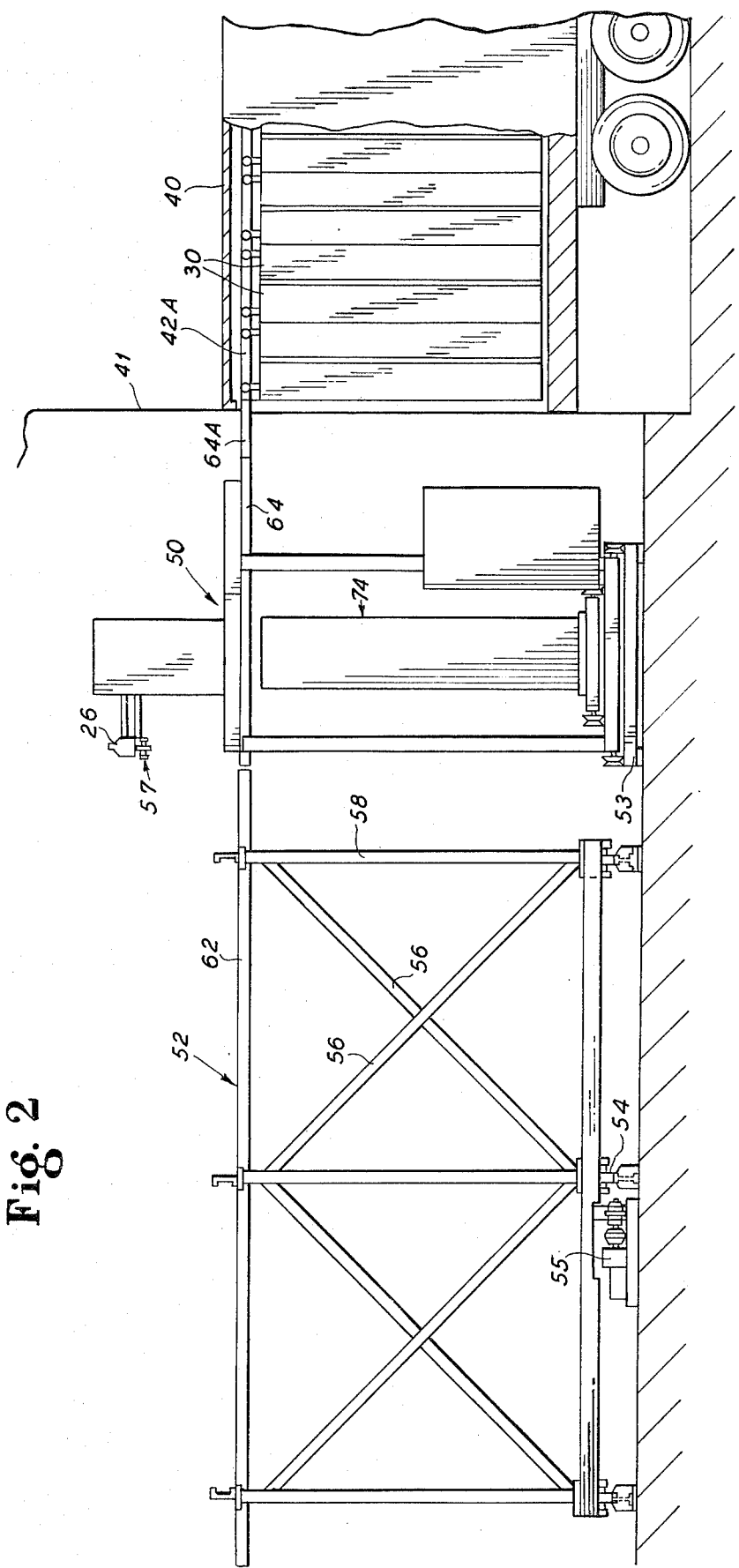
FIG. 2 is a front side elevational view taken along the lines 2—2 of FIG. 1.
Figure 3:
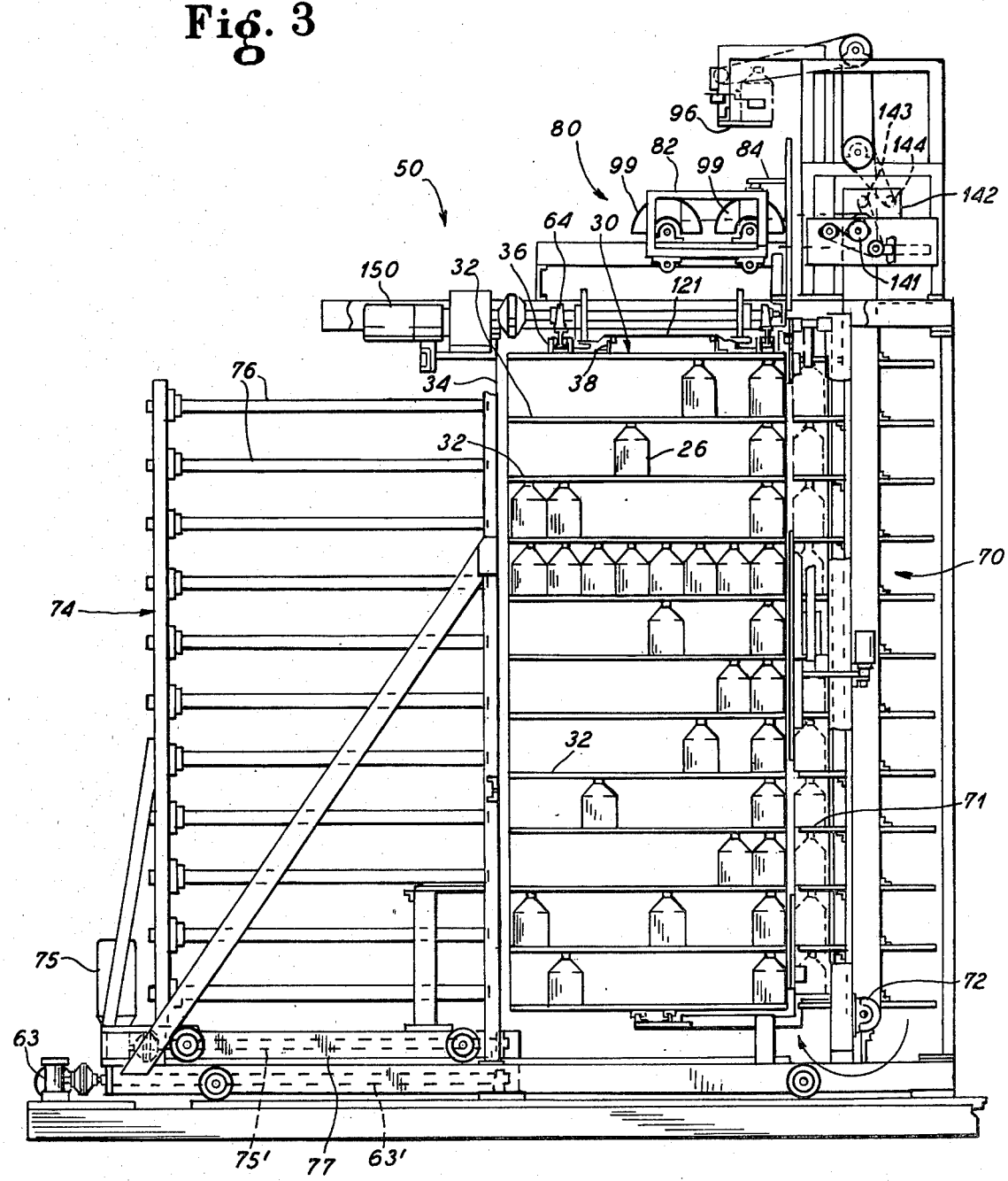
FIG. 3 is a side elevational view taken along the lines 3—3 of FIG. 1.

FIGS. 1 through 3, generally illustrate an automatic unloader system as disclosed in above-identified U.S. Ser. No. 111,019 and in which the present invention improvements are to be incorporated. Empty bottles are initially loaded into carriers or racks 30, one of which is illustrated in FIG. 3. Each carrier 30 is comprised of a stack of shelves 32 mounted in a welded structural frame 34. The shelves 32 may be formed of lightweight material, such as plastic or aluminum. The stacked array of shelves enable the carrier 30 to support a column-like matrix of bottles 26. The shelves 32 may be spaced from one another a distance only slightly greater than the bottle height. The bottles are arranged on each shelf 32 in a series of rows aligned behind a forwardmost line of bottles. Each shelf includes raised spacers (not illustrated) separating the shelf into rows to guide the bottles during loading and unloading. For the purpose of illustration, each carrier 30 contains 11 shelves 32 and each shelf supports four rows of bottles of nine bottles each. It will be appreciated that the carriers 30 and arrangement of shelves 32 can be modified to accommodate various other numbers of bottles, different container sizes, and variations in truck trailer heights.

Each carrier 30 is equipped with a set of overhead trolley rollers 36 which permit the carrier to travel suspended from railways. It will be appreciated that guide rollers may be added to the bottom of each carrier if desired. The carriers 30 are provided with releasable hook and latch means (not illustrated) at opposed ends of the carrier, so that one carrier can be secured to an immediately adjacent carrier. Interconnection of carriers enables a train of carriers to be moved in unitized fashion through the automatic unloader system.

The bottles 26 are loaded into carriers which are interconnected and placed onto overhead trolley rails 42 formed in a truck trailer 40. As shown in FIGS. 1 and 2, the trailer 40 is backed up to a loading dock or receiving doorway 41 at the dairy whereupon the carriers are unloaded. The automatic unloader system includes a bottle unloader section 50 and a carrier storage section 52. Both sections 50 and 52 have frameworks mounted on wheels which ride along lower tracks or pathways 53 and 54, respectively, so as to be laterally movable for purposes described hereinafter. A rope-type conveyor system 57 passes bottles from an upper area of the unloader section 50 onto the dairy's filling line.

The framework of the bottle unloader section 50 includes a single set of trolley rails 64. In preparation for unloading of the trailer 40, the bottle unloader 50 is positioned via a motor 63, which operates in a manual mode, until the rails 64 are aligned with a first row 42a of trailer rails. The drive transmission means 63' actuated by motor 63 may be a screw thread drive to afford precise control of the unloader's lateral position. The unloader rails 64 are each provided with relatively movable connector portions 64a at ends facing the truck trailer 40.

Figure 6:
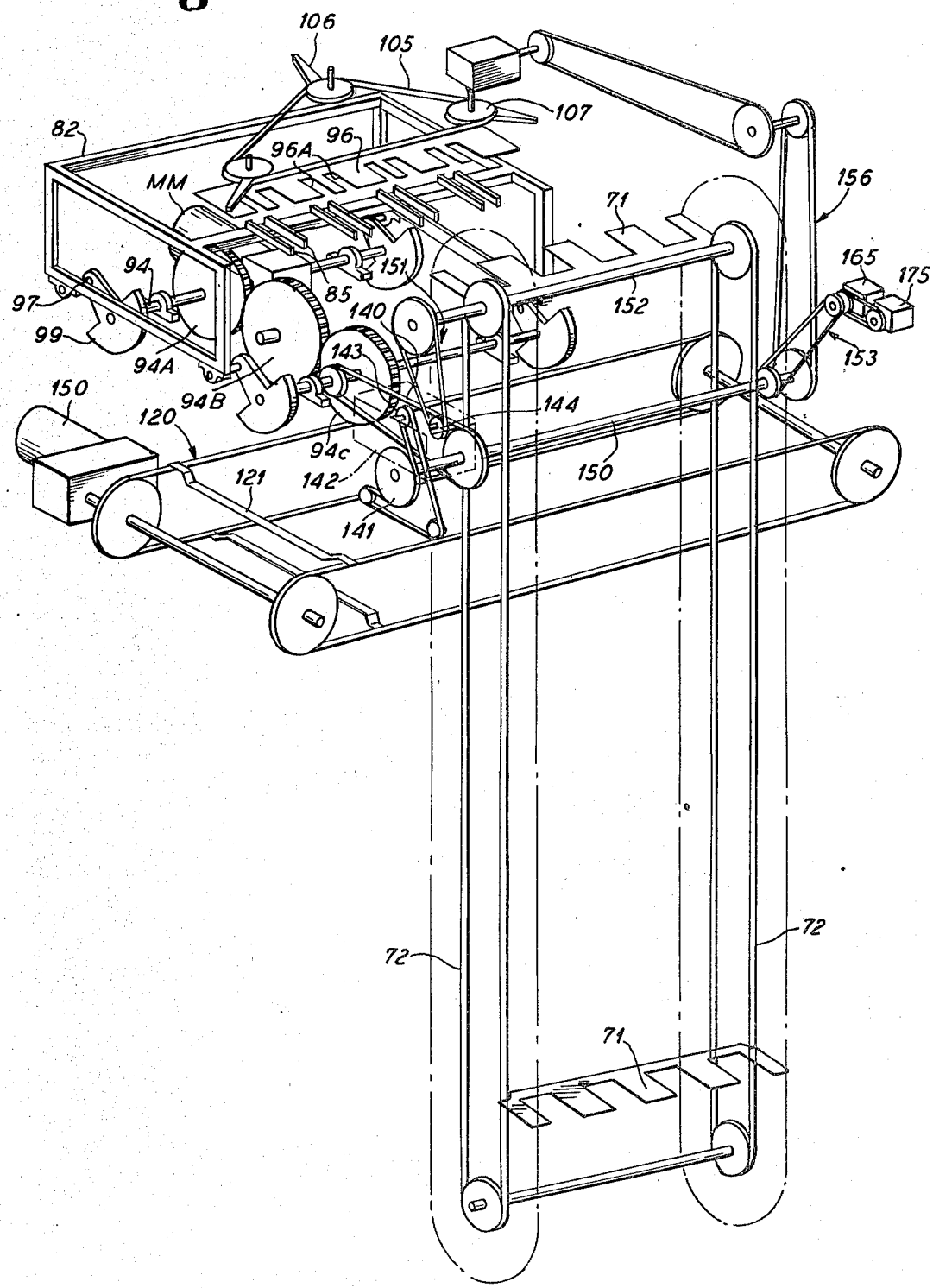
FIG. 6 is a schematic perspective view of correlated drive transmissions in the unloader section according to the present invention.

The carrier storage section 52 includes a steel framework of cross members 56 and vertical members 58 which serve to support two parallel rows of trolley rails 60 and 62. One storage rail set, 62, is positioned via a motor 55, which operates in a manual mode, until the rails are aligned with the unloader rails 64 to complete a transport path for the carriers 30 from the unloader section 50. The carriers are drawn from the trailer 40 and propelled along the transport path by means of a carrier toe or conveyor mechanism 120 contained in the unloader section 50. As illustrated in FIGS. 3 and 6, the carrier conveyor 120 is comprised of an endless drive chain belt 122 having symmetrically spaced therealong engagement bars 121. The belt 122 is mounted between the unloader rails 64 and generally over the rail plane. The chain 122 is driven by a reversible rotary motor 150. The carrier conveyor motor 150 is activated in a manual mode to draw the carrier train from the trailer as illustrated by the solid line arrow in FIG. 2. Succeeding carriers continue to be drawn from the trailer 40 by virtue of abutment projection means 38 formed on the tops of the carriers 30. The carrier abutments 38 are spaced apart along the carrier train to coincide with the spacing between the engagement bars 121 on the carrier conveyor belt 122 for engagement with the bars 121.

After the first storage rail set 60 has been loaded with a half-trailer row of carriers 30, the carrier conveyor drive 150 is stopped, by manual mode control, and the last carrier placed in a storage section 52 is disconnected from the succeeding carrier still in the unloader section 50. Storage drive motor 55 is then operated to bring the remaining storage rails 62 into alignment with unloader rails 64 as illustrated in FIG. 1, whereupon the carrier conveyor drive is actuated to feed the remaining carriers from the trailer rails 42a into the storage section 52.

After the storage section 52 has been loaded with bottle carriers, automatic bottle unloading begins. The carrier conveyor drive 150 is reversed and an engagement bar 121 contacts an abutment 38 on the final carrier delivered from the trailer 40 to begin drawing the carrier train from storage rails 62 back through the bottle unloader section 50. The carrier conveyor 120 is able to engage with the final carrier's abutments 38 since the final carrier has not been passed from the unloader section 150. Position limit control means serve to spot each carrier within the unloader section while its bottles are removed therefrom.

When the conveyor 120 is so stopped, a carrier 30 is positioned between a push rod assembly 74 and a vertical lift bottle elevator mechanism 70 as illustrated in FIG. 3.

The unloader push rod assembly 74 is comprised of a framework 77 which is supported on wheels for lateral movement toward and away from the carrier 30 positioned within the unloader sections 50. A reversible rotary servo motor means 75 actuates a push rod drive transmission 75', which is shown to be a screw thread drive for precise control. The push rod motor 75 is operated by suitable control means such as disclosed in the above-identified U.S. Ser. No. 111,019. An array of push rods 76 extend laterally from the assembly framework. Each push rod 76 is positioned to be centered on the rearmost bottle 26 in a respective bottle row contained on carrier shelf 32. The push rod assembly 74 serves to pass a line of bottles from each shelf a line at a time from the carrier and onto elevator flights or platforms 71, positioned in line with the carrier shelves 32 and bifurcated by spaces 73 at their outermost edges. The elevator flights or platforms 71 are secured to an endless chain belt drive 72 and symmetrically spaced apart from each other so as to coincide with the shelves 32 on the carrier 30.

Figure 5:
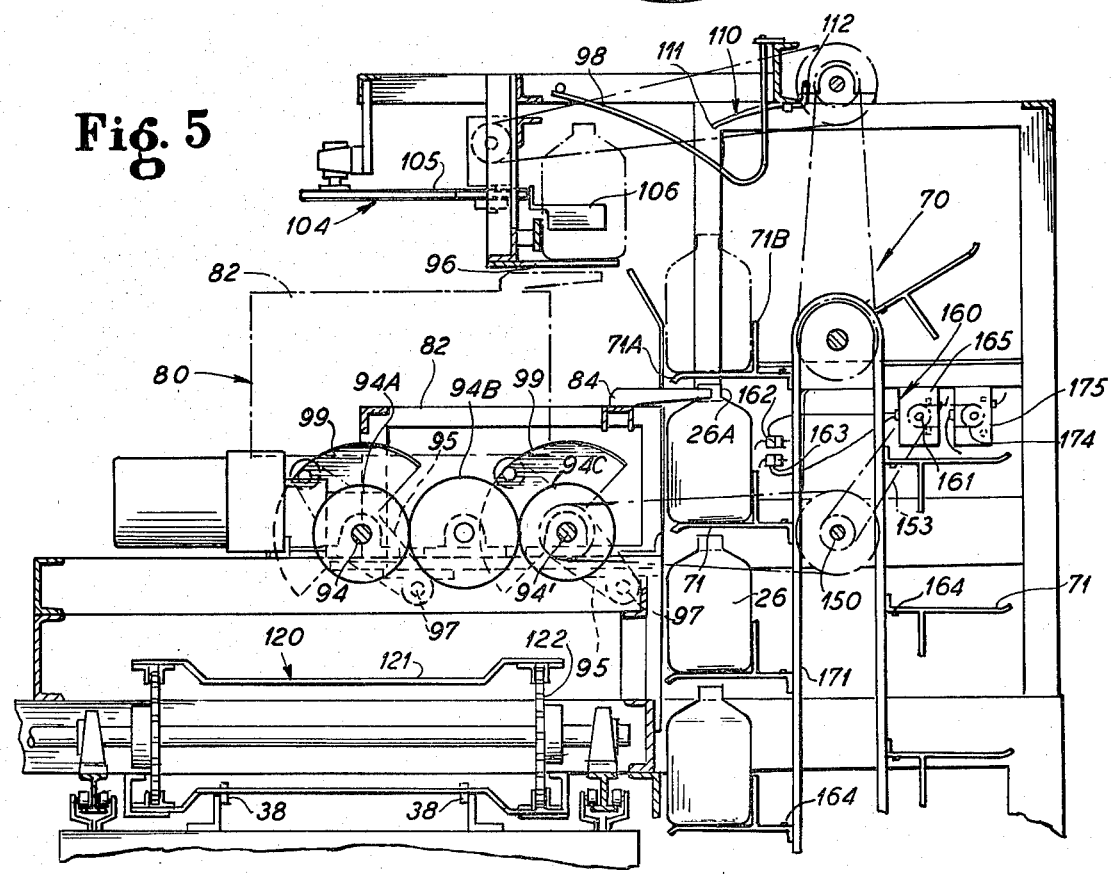
FIG. 5 is a side elevational view taken along 5—5 of FIG. 4.

In order to allow for a slight misalignment of the shelves 32 and elevator platforms 71, the platforms 71 are formed with a curved front lip portion 71A, illustrated in FIG. 5, which serves to cam the bottles 26 onto the platform. The platforms 71 are also given an approximately 5° tilt from horizontal to ride the bottles 26 against back plate members 71B for a stable transport of the bottles without the need for guide doors or rails. The elevator platforms 71 are passed upwardly whereupon a bottle transfer mechanism 80 removes the bottles from each respective platform. A control means such as disclosed in U.S. Ser. No. 111,019 monitors when the number of platforms corresponding to the number of carrier shelves 32 laden with bottles has passed through the transfer mechanism 80, whereupon the elevator is stopped and the push rod assembly is again indexed forward to pass succeeding lines of bottles onto the platforms for the process to repeat.

Figure 4:
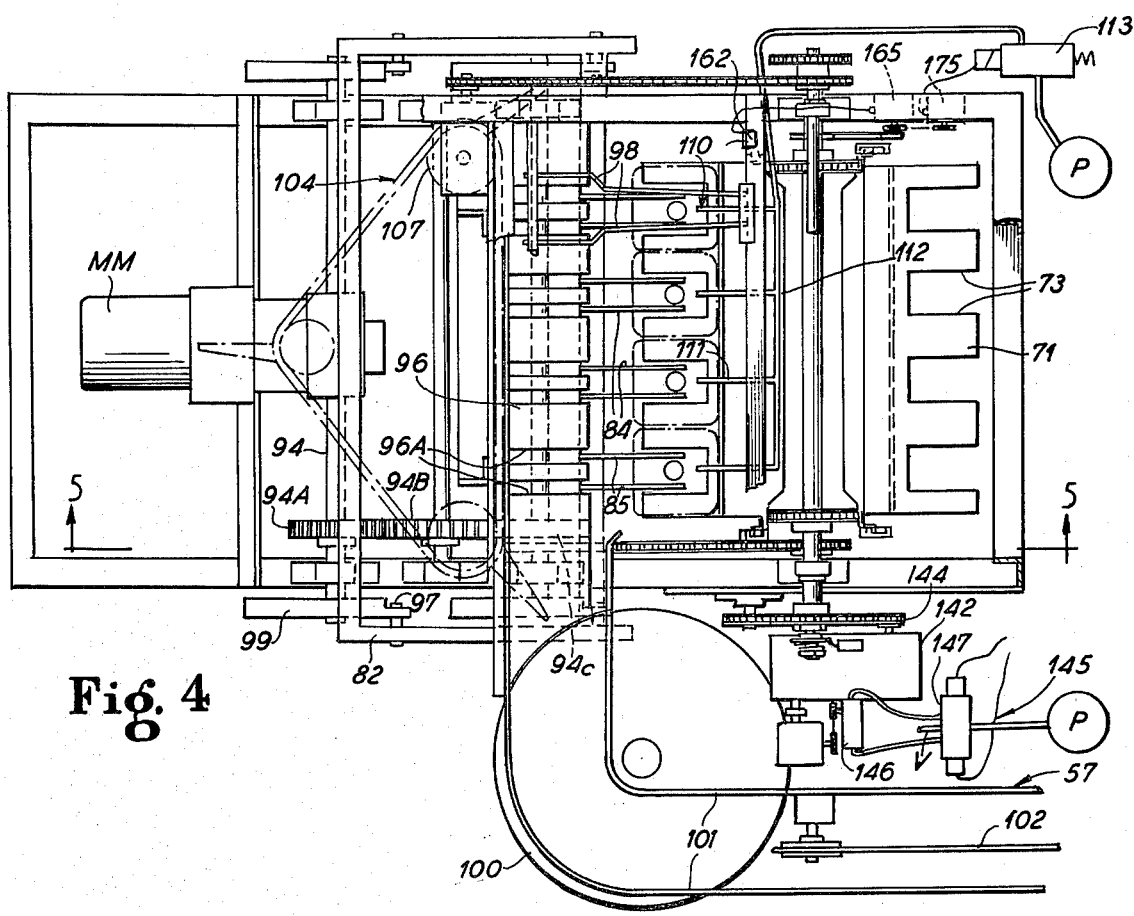
FIG. 4 is a plan view of the elevator and transfer mechanism portions of the unloader unit.

The bottle transfer mechanism 80 is best illustrated in FIG. 5. The mechanism is comprised of a frame 82 having extending horizontally outward from adjacent a corner facing the elevator 70 a series of lift fingers 84. The lift fingers 84 are driven with the frame 82 along a circular path such that the set of lift fingers 84 come up from beneath each bottle laden platform 71, intermesh within the bifurcation spaces 73 provided in the platforms, and pass above the platform carrying the line of bottles with it. The lift fingers 84 are able to pass through the elevator platforms bifurcation despite the presence of a succeeding line of bottles on the next platform below by virtue of their spacings 85, as shown in FIGS. 4 and 6, which enable the fingers 84 to fit about the necks 26A of the succeeding bottle line. The transfer mechanism 80 must make one revolution for each linear movement of an elevator platform to the position of the previous platform. The now bottle laden fingers 84 pass quickly upward where they move over and down through slots 96A formed in a stationary shelf 96. As the fingers 84 move through the slots 96A, the line of bottles are deposited onto the shelf 96 as illustrated by the dotted line depiction in FIG. 5. A set of bottle neck guides 98 are located over the platform 96 to prevent the bottles from tipping as they are picked up from the elevator 70 and deposited onto the platform 96. In order to accomplish its movement, the frame 82 is secured at its lower end to a pair of arms 95 through loose connections 97. The arms 95 are rotated respectively by shafts 94 and 94'. Movement of the lift mechanism frame 82 on rotary shafts 94 and 94' is balanced by means of eccentrically mounted counterweights 99.

Air assist means 110 direct synchronized bursts of pressurized air against the bottles 26 deposited onto the stationary shelf 96 to ensure a stable alignment thereon prior to being pushed onto the conveyor system 57. The assist means 110 include a series of nozzles 111, extending from a manifold pipe 112. There is one nozzle for each bottle in the unloaded bottle line; and each nozzle is aimed approximately for the center of gravity of a bottle as it is deposited on the shelf 96. A solenoid-actuated valve 113 controllably connects the manifold pipe 112 and nozzles 111 with a source of pressurized air P. Valve 113 is opened to coincide with the deposit of a bottle line on shelf 96 by the transfer mechanism 80 by means to be described hereinafter.

The stationary platform 96 is part of an intermediate conveyor mechanism 104 for passing a deposited line of bottles onto the rope conveyor system 57. The intermediate conveyor is comprised of an endless belt 105 having symmetrically spaced therealong three paddles 106. The belt 105 is wrapped around two idler rollers and a drive roll 107. Each paddle contacts a rearmost bottle in the deposited line and pushes this container and ones in front of it onto a conveyor wheel 100 as shown in FIG. 4. The conveyor 57 receives the bottles between guide rails 101. The conveyor wheel 100 moves the bottles onto a rope conveyor 102 which may lead to a dairy filling line.

The intermediate conveyor 104, bottle elevator 70, and transfer mechanism 80 are all driven in correlation with one another in continuous, simultaneous motion from a common drive rotary motor MM for rapid bottle unloading and transfer onto the dairy conveyor system 57. It is most critical that relative movement of the transfer mechanism fingers 84 and elevator platforms 71 be maintained in proper synchronization. Inherent slack and stretch of drive transmission means, especially chains, can cause relative slippage between the transfer mechanism 80 and the elevator 70. If the movement of the elevator 70 advances relative to the transfer mechanism 80, the lift fingers 84 may arrive too far below a platform 71 to stably lift off the line of bottles 26 and may collide with the body portions of the succeeding line of bottles on the next adjacent platform, rather than pass safely about the necks of these bottles. If movement of the elevator 70 lags the transfer mechanism 80, fingers 84 may collide into the line of bottles to be picked off, rather than engage the bottle bases from below for lift-off.

In order to maintain proper synchronization despite prolonged use of the unloader 50, a synchronization control system is provided to speed up or slow down the elevator 70 according to the speed and position of the transfer mechanism 80 and the drive motor MM is positioned to ensure steady movement of the transfer mechanism. By elminating jerking motion of the transfer mechanism 80, a steady input is provided for the synchronization control system and the possibility of throwing bottles 26 from the transfer fingers 84 is reduced.

As illustrated in FIGS. 4 through 6, drive motor MM is mounted in the unloader 50 above rails 64 in a direct drive relationship with transfer mechanism drive shaft 94. A gear train whereby a drive gear 94A connected with the shaft driven by motor MM drives an intermediate gear 94B which drives a gear 94C connected with the more forward drive shaft 94' is provided, rather than a belt, to obviate slippage due to movement of the counterweight 99 on shaft 94'. This positioning obviates slippage of drive 94 and 94' which may occur whenever the transfer mechanism 80 is driven at a distance through chain belt transmission means as movement of the eccentric counterweights 99 shifts the tension of the belt.

The synchronization control system operates as follows. Power take-off means, including chain belt 140, shaft 150, and drive train 141, drivingly connect shaft 94' with the input 143 for a variable speed transmission 142, having an output 144. Shaft 150 is connected at an opposed end with a drive train 156 to drive the intermediate conveyor's drive roll 107. The output 144 is drivingly connected through a speed reduction transmission 151 to a sprocket shaft 152. The sprocket shaft 152 serves as the elevator's drive shaft for the elevator belt 72.

The output speed is adjusted relative to the input speed by means of a fluid-operated regulator 145. The regulator includes a motor chamber cylinder 146, shown in FIG. 4, which contains a double-acting piston and is connected at opposed ends with flow lines in communication with a solenoid-actuated four-way control valve 147. Alternate movement of valve 147 connects alternate opposed sides of the motor piston with a source of pressurized air, shown schematically as P, and ambient through a vent V. The piston is rotatable on a swivel shaft (not shown) which extends through a sidewall of the cylinder in driving connection with the speed control linkage for the variable speed transmission 142. Rotative movement of the piston due to the pressure differential across its faces adjusts the relative input to output speed changes across the variable speed transmission 142.

Control signals to the solenoids which actuate the four-way valve 147 are produced by means of a position comparator switch 160. The comparator 160 serves to detect when movement of the elevator 70 has advanced or slowed relative to movement of the bottle transfer mechanism 80 beyond a predetermined small range of deviation. Depending on what the comparator 160 detects, it signals the variable speed transmission regulator 145 accordingly to adjust the relative speed of the elevator drive shaft 152 to bring the elevator into synchronization with the transfer mechanism 80 within the predetermined deviation range. The comparator 160 operates as follows.

Drive take-off means 153 from shaft 150, which is driven from the transfer mechanism drive shaft 94', drives a camshaft 161 in synchronization with the transfer mechanism drive 94 and 94'. Camshaft 161 is part of a timing switch means 165, such as the commercially available "Candy/Switch" manufactured by Candy Mfg. Co., Inc., of Chicago, Ill. Once every revolution, the camshaft 161 trips a cycle switch for a period of time depending on the particular cam dwell. When the cycle switch is closed, a circuit may be completed with either of two limit switches 162 and 163. Limit switches 162 and 163 are vertically spaced by a short gap as shown in FIG. 5 and tripped by reference projections 164 associated with each elevator platform 71. A belt guide 171 in the form of metal plates serves to maintain the elevator drive belt 72 along a fixed path in the proximity of the limit switches 162 and 163 to assure proper detection of the reference projections as they pass the limit switches. Each limit switch serves to transmit a particular solenoid signal to regulator valve 147 when its circuit is completed.

The comparator 160 is calibrated so that the cycle switch closes when a platform reference projection lies in the gap between switches 162 and 163. Should the elevator 70 begin to advance relative to movement of the transfer mechanism 80, upper switch 162 would be triggered by a platform projection during the time camshaft 161 has closed the cycle switch. When the comparator circuit is completed with switch 162, a solenoid signal is sent to regulator valve 147 which is then positioned to produce a fluid flow causing regulator piston 146 to adjust the variable speed transmission 142 to retard the present speed of the elevator drive shaft 152. Should the elevator begin to retard relative to movement of the transfer mechanism 80, lower switch 163 would be triggered by a projection to produce the opposite reaction upon the elevator drive. The gap between limit switches 162 and 163 may be set wide enough to allow for some deviation, so that there is not a constant back and forth hunting action by the platform reference projections within the gap between limit switches 162 and 163. It has been found that a still relatively small tolerance in the gap results in a gradual drift of projection positions from one switch to the other.

In order to synchronize operation of the air assist means 110 with movement of the transfer mechanism 80, a drive transmission means 173 is connected from camshaft 161 to a camshaft 174 for a second timing switch means 175, as shown in FIG. 5, to drive camshaft 174 in synchronization with rotation of the transfer mechanism drive 94 and 94'. The cam trip of the cycle switch in the second timing switch means 175 is set manually to be at the point of revolution of the transfer mechanism 80 when a line of bottles has just been deposited on stationary shelf 96. When the cycle switch is closed, a solenoid signal is sent to valve 113 to open whereupon pressurized air is expelled from the air assist nozzles 111 to position the bottles upon the shelf 96.

When the push rods 76 have fully indexed through the carrier 30 and the rearmost lines of bottles have been loaded onto the elevator platforms 71, control means as disclosed in U.S. Ser. No. 111,019 cause the push rod assembly 74 to fully retract in the unloader section 50 and activate the carrier conveyor drive 150 so that another bottle carrier 30 can be brought into the unloader section 50. Carriers 30 continue to be drawn from storage section rails 62 and their bottles unloaded onto the bottle elevator platforms 71 until rails 62 have been emptied. At this point, the carrier conveyor is disengaged by manual mode and the storage section drive 55 is activated by manual mode to bring storage rails 60 into alignment with the unloader rails 64. The bottle unloading operation described above is then commenced for the carriers 30 stored on rails 60.

Unloader section drive 63 and storage section drive 55 are operated in the manner as described above in connection with the unloading of the first row of carriers 30 to align their respective rails with the other set of trailer rails 42B so that the second row of carriers 30 can be removed from the trailer 40. However, instead of initially unloading the whole second carrier train into the storage section 52 before commencing the bottle unloading operation, it is now preferable to unload the bottles from the carriers as they pass for the first time through the unloader section. In this manner, a more continuous flow of bottles is passed onto the dairy conveyor 57 since the unloading system of the present invention is able to supply bottles 26 to the filling line at a rate sufficient to permit sustained and continuous operation of the dairy conveyor system. Control means such as disclosed in U.S. Ser. No. 111,019 are activated as before to consecutively stop each carrier 30 in the unloader section 50 whereupon its bottles are removed and transferred to the conveyor 57. After bottle unloading is completed, each carrier is passed into the storage section 52 in the manner in which the first row of carriers were loaded into storage. Then, after the second row of carriers has been unloaded, the carriers are returned to the trailer 40 in similar manner as the first row of carriers, absent stops for unloading.

Although various minor modifications may be suggested by those versed in the art, it should be understood that I wish to embody within the scope of the patent warranted hereon all such modifications as reasonably and properly come within the scope of my contribution to the art.

I claim as my invention:

1. In an article unloader system having a carrier for holding articles arranged in a stack of shelves, each shelf containing rows of articles, means for intermittently simultaneously unloading only the forwardmost rows of articles from said carrier, an elevator means having a plurality of flights respective to receive the unloaded rows of articles for intermittently transporting the unloaded rows of articles, a transfer mechanism being driven in circular motion cycles for removing the unloaded rows of articles a row at a time as each said flight reaches a predetermined point of travel and passing each said removed row of articles onto a conveyor means, a common drive source, and corresponding drive transmission means extending from said drive source for simultaneously intermittently driving said elevator means and said transfer mechanism, the improvement comprising:

a synchronization control means for regularly detecting the rate of movement of said elevator means at least once every cycle of said transfer mechanism and adjusting the speed of said elevator means to bring said elevator means back into synchronization with said transfer mechanism whenever movement of said elevator means is out of correlation with said transfer mechanism.

2. The improvement according to claim 1, further comprising:

said synchronization control means including a variable speed transmission means along said drive transmission means for driving said elevator, a regulator means for adjusting speed change through said variable speed transmission means, and a comparator switch means for detecting movement of said elevator out of correlation with said transfer mechanism and causing said regulator to adjust said variable speed transmission to bring said elevator back into synchronization with said transfer mechanism.

3. The improvement according to claim 2, further comprising:

said comparator switch means comprising vertically spaced apart limit switches, said limit switches being tripped by projection means associated with each elevator flight.

4. The improvement according to claim 2, further comprising:

said regulator means comprising a fluid control valve means for connecting working chambers of a fluid motor means with a source of pressure fluid or ambient.

5. The improvement according to claim 1, further comprising:

said common drive source being mounted in direct drive relationship with at least one drive shaft for said transfer mechanism.

* * * * *